United States Patent [19]

Phillipson

[11] Patent Number: 4,578,545

[45] Date of Patent: Mar. 25, 1986

[54] CONTACT AND TERMINAL FOR TELEPHONE TRANSMITTER

[75] Inventor: Walter M. Phillipson, Woodside, N.Y.

[73] Assignee: Stewart Stamping Corp., Yonkers, N.Y.

[21] Appl. No.: 606,899

[22] Filed: May 3, 1984

[51] Int. Cl.⁴ .......................... H01R 4/00; H01R 9/00
[52] U.S. Cl. .................................. 179/178; 179/131; 179/137; 179/140; 339/217 R
[58] Field of Search .................. 179/178, 187, 182 R, 179/121 R, 131, 136, 137, 140, 141; 339/217, 252 R

[56] References Cited

U.S. PATENT DOCUMENTS

| 3,397,383 | 8/1968 | Prifogle et al. | 339/252 R |
| 4,295,009 | 10/1981 | Weidler | 179/179 |
| 4,474,420 | 10/1984 | Nestor | 339/252 R |

FOREIGN PATENT DOCUMENTS

| 711924 | 10/1941 | Fed. Rep. of Germany | 339/252 R |
| 241553 | 12/1964 | Fed. Rep. of Germany | 179/178 |
| 662905 | 4/1964 | Italy | 339/252 R |
| 382315 | 8/1973 | U.S.S.R. | 339/252 R |

Primary Examiner—Gene Z. Rubinson
Assistant Examiner—Danita R. Byrd
Attorney, Agent, or Firm—Steinberg & Raskin

[57] ABSTRACT

A contact for a telephone transmitter is formed of a single piece of electrically conductive metal with a connector portion adapted to receive a contact terminal of a conductor associated with a modular connector receiving jack within the telephone handset, a curved, flexible contact portion adapted to electrically engage the central or outer contact of a telephone transmitter and an intermediate fastening portion. The fastening portion cooperates with an opening formed in the base wall of a telephone transmitter cup to permit the contact to be affixed thereto such that the contact portion is situated within the cup to electrically engage the transmitter contact and such that the connector portion is situated beneath the transmitter cup base wall for engaging the contact terminal of the jack conductor.

18 Claims, 7 Drawing Figures

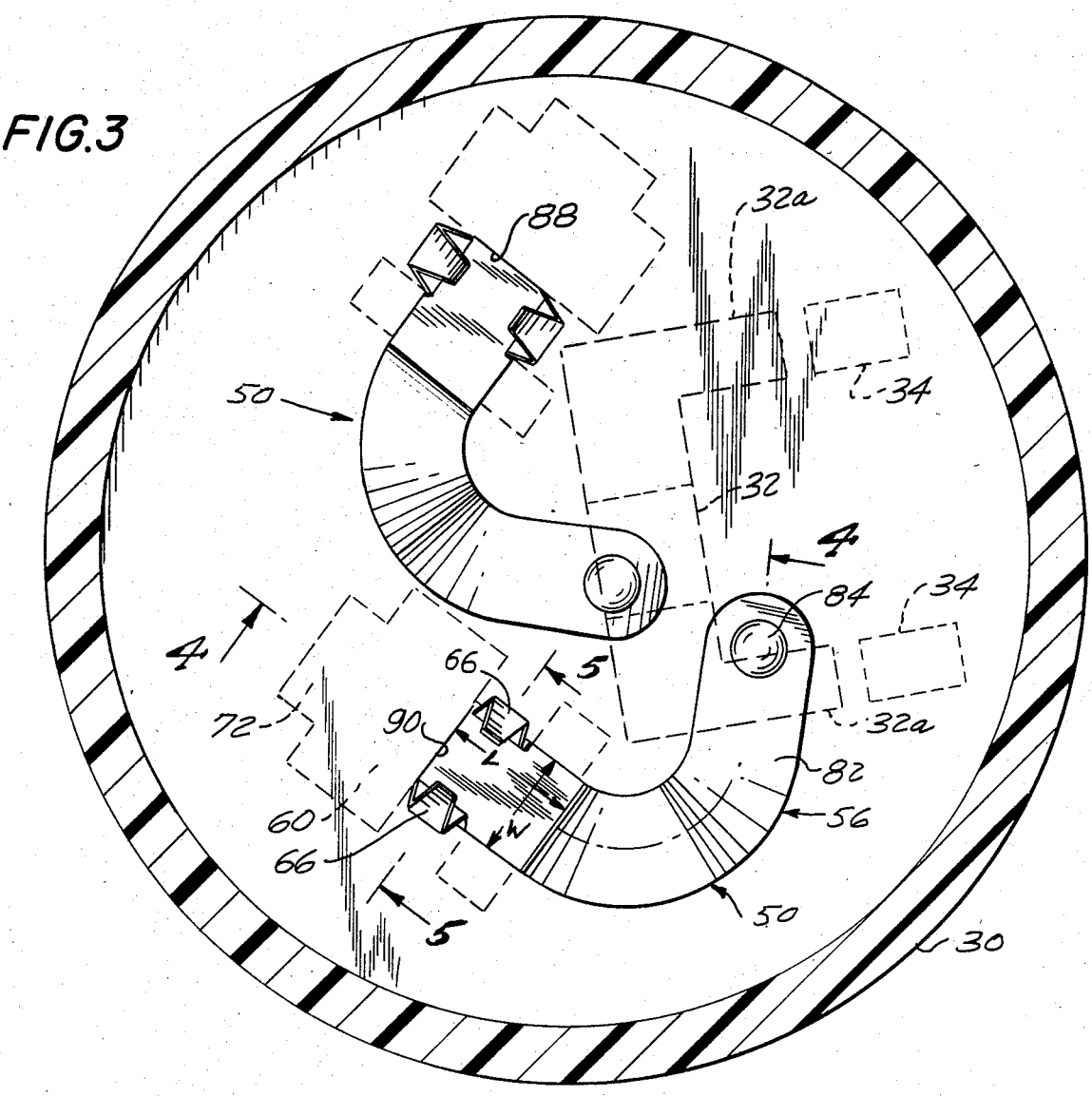
FIG. 3
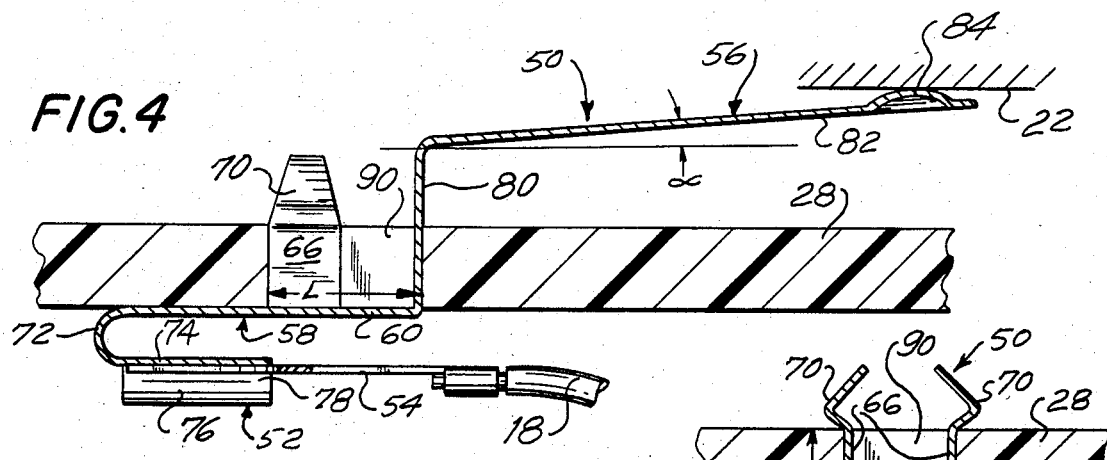
FIG. 4
FIG. 5

CONTACT AND TERMINAL FOR TELEPHONE TRANSMITTER

BACKGROUND OF THE INVENTION

The present invention relates generally to electrical contacts and connectors and, more particularly, to electrical contacts and connectors designed for use in telephones for electrically coupling conductors to the transmitter contacts in a telephone handset.

The handset portion of a telephone is generally interconnected to the telephone base portion by a multi-conductor cord. The cord may be terminated by modular plug type connectors, one of which is inserted into a jack assembled in the transmitter end of the handset while the other plug type connector is inserted into a jack in the telephone base.

Two of the conductors associated with the connector receiving jack in the telephone handset are adapted to be coupled to repective contacts of the telephone transmitter. In this connection a so-called transmitter cup is received in one end of the handset. The transmitter cup generally includes a base wall from which an upstanding peripheral wall extends and a slotted wall which depends downwardly from the base wall which together with a pair of downwardly depending fingers forms means for mounting the jack to the underside of the transmitter cup. The transmitter rests on the upper edge of the peripheral wall of the cup and is fixed in position by an apertured cap threadedly fixed over the end of the handset. The transmitter is designed with an outer ring-shaped contact and an inner central contact, the transmitter contacts being adapted to be coupled to a respective pair of conductors associated with the modular plug-type connector receiving jack.

In order to couple the jack conductors to the transmitter contacts, it has been conventional to bore a pair of holes through the base wall of the transmitter cup through which respective conductive internally threaded bushings are passed. A pair of leaf spring contacts situated within the transmitter cup are affixed at one of their ends to the bushings by upsetting the end regions of the bushings which extend into the cup whereupon screws are threaded through the bushings from outside the cup. The jack conductors are electrically connected to the bushings by tightening the heads of the respective screws over spade contacts which terminate the conductors. The free ends of the leaf spring contacts are adapted to engage the inner and outer contacts of the transmitter to complete the connection.

It is apparent from the foregoing that the conventional construction and assembly of the contact structure associated with the transmitter cup in a telephone are relatively complicated and time consuming and, as such, relatively expensive.

SUMMARY OF THE INVENTION

It is a main object of the present invention to provide new and improved electrical contact and connector apparatus for electrically coupling conductors to the contacts of a transmitter in a telephone handset.

Another object of the present invention is to provide new and improved electrical contact and connector apparatus for electrically coupling conductors to the contacts of a transmitter in a telephone handset having a construction which is simpler and more economic than in the case of conventional contact constructions.

Still another object of the present invention is to provide new and improved electrical contact and connector apparatus for electrically coupling conductors to the contacts of a transmitter in a telephone handset and wherein the assembly of the contacts to the transmitter cup is simpler and more economic than in the case of conventional constructions.

Briefly, in accordance with the present invention these and other objects are attained by providing a contact formed of a single electrically conductive piece of sheet metal which is integrally formed to provide a connector portion adapted to electrically engage a contact terminal of a conductor associated with the cord leading to the handset or with a connector receiving jack provided within the telephone handset, a flexible contact portion adapted to electrically engage one of the central or outer contacts of the telephone transmitter and a fastening portion formed intermediate of the connector and contact portions.

The fastening portion of the contact cooperates with an opening formed through the base wall of the telephone transmitter cup to permit the contact to be affixed thereto such that the contact portion is situated within the cup to electrically engage the transmitter contact and such that the connector portion is situated beneath the transmitter cup base wall for electrically engaging the contact terminal of the cord or jack conductor. The fastening portion of the contact is formed in a manner so that when the contact is affixed to the transmitter cup, the opening formed in the base wall of the cup is substantially completely obstructed to assure that dirt or other contaminants cannot pass therethrough.

BRIEF DESCRIPTION OF THE DRAWINGS

A more complete appreciation of the present invention and many of the attendant advantages thereof will be more fully appreciated as the same becomes better understood from the following detailed description when considered in connection with the accompanying drawings in which:

FIG. 3 is a section view taken along line 3—3 of FIG. 2;

FIG. 4 is a section view taken along line 4—4 of FIG. 3;

FIG. 5 is a section view taken along line 5—5 of FIG. 3;

DETAILED DESCRIPTION OF THE PREFERRED EMBODIMENTS

Figure 1:
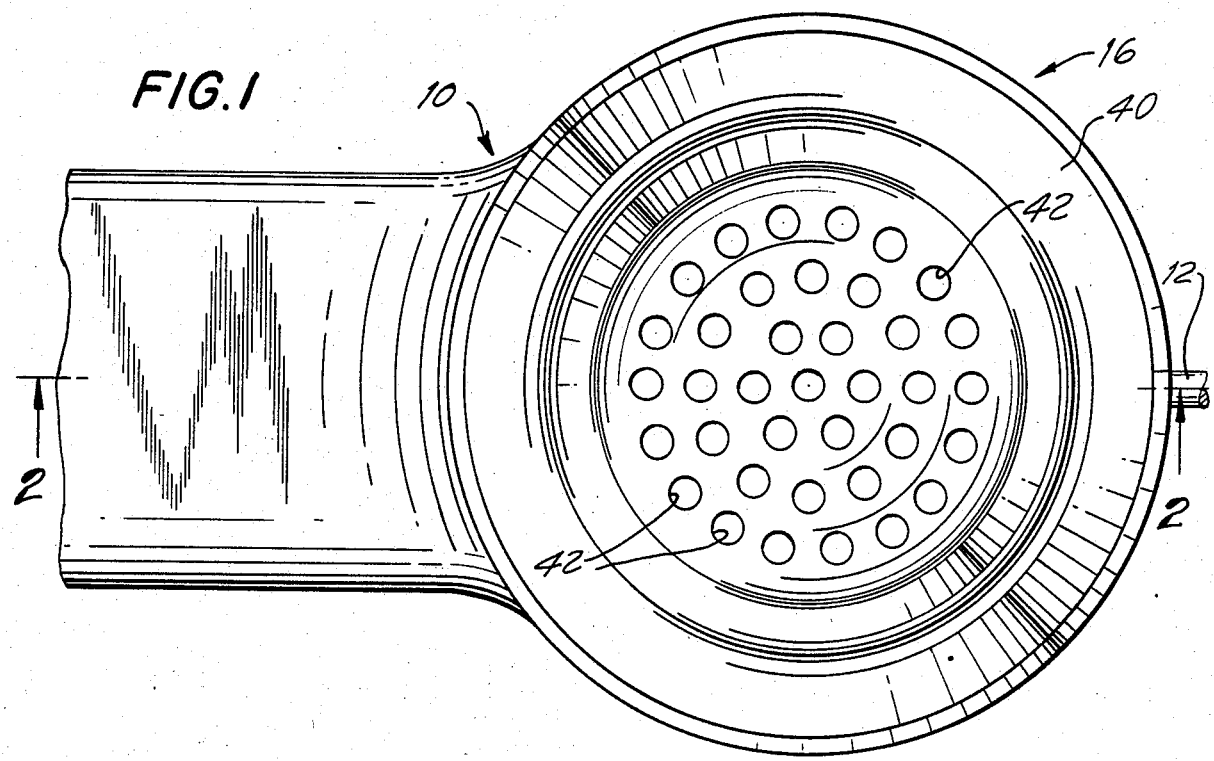
FIG. 1 is a top plan view of the transmitter end of a telephone handset.
Figure 2:
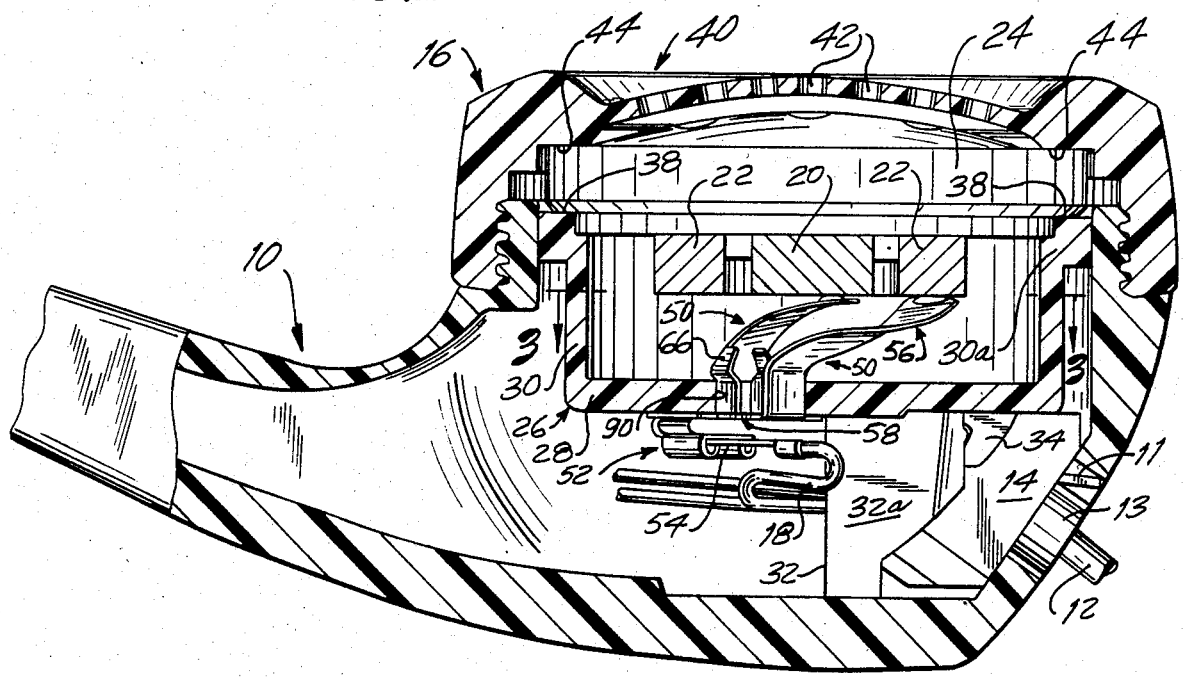
FIG. 2 is a section view taken along line 2—2 of FIG. 1 and illustrating contact apparatus in accordance with the invention in assembled form.

Referring now to the drawings wherein like reference characters designate identical or corresponding parts throughout the several views, and more particularly to FIGS. 1 and 2, a telephone handset 10 is interconnected to a telephone base portion (not shown) by a multi-conductor cord 12 terminated by a modular plug type connector 13 which is inserted through an opening 11 in the handset into a jack 14 assembled in the transmitter end 16 of handset 10.

Two of the conductors 18 (only one shown) associated with the jack 14 are to be coupled to respective inner and outer contacts 20 and 22 of the telephone transmitter 24. A transmitter cup 26 received in the transmitter end 16 of handset 10 includes a base wall 28 from which an upstanding peripheral wall 30 extends and a slotted wall 32 having side flanges 32a depends downwardly from the base wall 28. Slotted wall 32 cooperates with a pair of downwardly depending fingers 34 (only one shown) to form means for mounting the jack 14 at the underside of the transmitter cup base wall 28 adjacent to opening 11 in a position so as to be receivable of connector 13. A flange 30a extends outwardly at the upper end of peripheral wall 30 to present a downwardly facing shoulder which engages upwardly facing shoulders 36 which extends inwardly within the handset to position the cup 26 within the handset end 16.

As noted above, the transmitter 24 has an inner central contact 20 and an outer contact 22 having a ring shape surrounding the central contact 20. The transmitter 24 rests on the upper edge surface 38 of transmitter cup 26 with contacts 20, 22 extending into the cup and is fixed in this position by a cap 40 having a plurality of apertures 42 formed therethrough. Thus, the cap 40 is screwed tightly onto the handset to hold the transmitter in place between the upper edge surface 38 of cup 26 and an inner annular surface 44 of cap 40.

Figure 7:
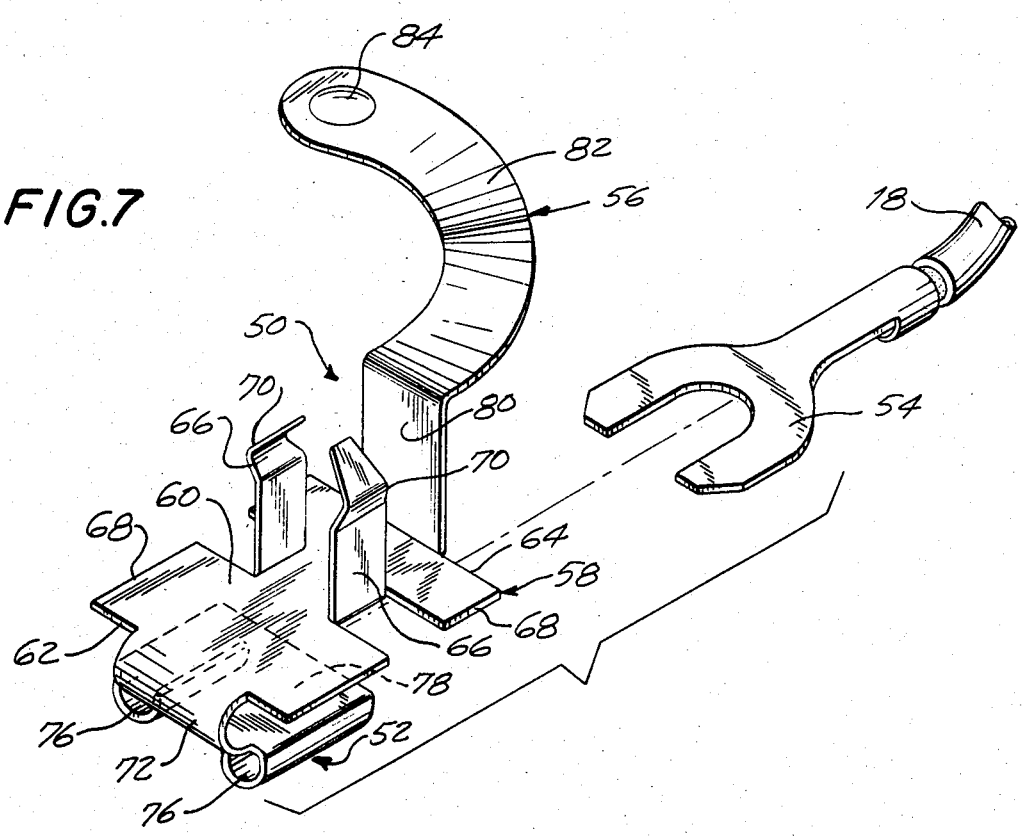
FIG. 7 is a perspective view of contact apparatus formed from the sheet metal blank of FIG. 6 in accordance with the invention and illustrating the contact terminal of a cord or jack conductor prior to the latter being electrically coupled to the contact.

In accordance with the invention, electrical contact and connector apparatus, generally designated 50, are provided for electrically coupling the pair of conductors 18 to respective transmitter contacts 20 and 22. Referring to FIG. 7, a contact 50 in accordance with the invention is formed of a single piece of electrically conductive sheet metal which is integrally formed to provide a connector portion 52 adapted to electrically engage a contact terminal 54 of the conductor 18 connected to jack 14, a curved, contact portion 56 adapted to engage one of the central or outer contacts 20 and 22 of transmitter 24, and an intermediate fastening portion 58. As described below, the fastening portion 58 cooperates with an opening formed through the base wall 28 of transmitter cup 26 to affix the contact thereto such that the contact portion 56 is situated within the cup to electrically engage a transmitter contact and such that the connector portion 52 is situated beneath the transmitter cup base wall for connection to the contact terminal 54 of conductor 18.

Figure 6:
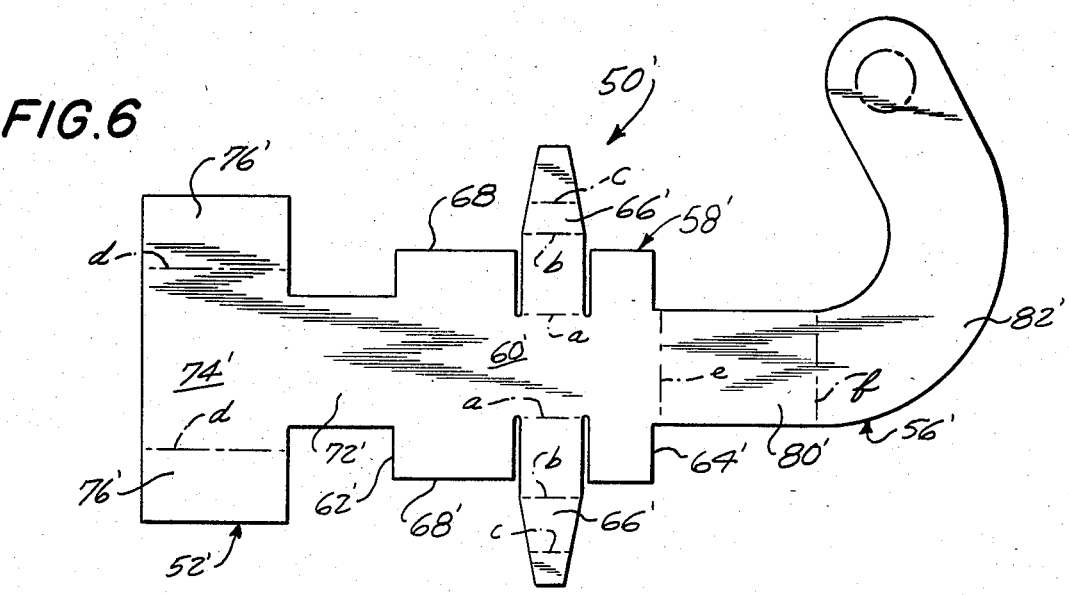
FIG. 6 is a top plan view of a sheet metal blank from which contact apparatus in accordance with the invention is formed.

According to the illustrated preferred embodiment, the fastening portion 58 of contact 50 is constituted by a substantially rectangular, planar base portion 60, the connector and contact portions 52 and 56 integrally extending from opposite edges 62 and 64 of planar base portion 60. A pair of ears 66 are struck from the side edges 68 of planar base portion 60 and are bent so as to extend upwardly from and generally at right angles to the planar base portion 60. As best seen in FIG. 6 wherein a blank 50' from which the contact 50 is formed is illustrated, the ears 66 when folded into the plane of the base portion 60 extend beyond the side edges 68 thereof. The free end region of each ear 66 is formed to provide an outwardly directed V-shaped engagement portion 70 and the height H of the portion of each ear 66 between the planar base portion 60 and the beginning of its engagement portion 70 is substantially equal to the thickness of the base wall 28 of cup 26 as best seen in FIG. 5.

The connector portion 52 is integrally connected to the planar base portion 60 by a U-shaped web 72 of the sheet metal so that the connector portion 52 is situated underneath the planar base portion 60 in opposed relationship therewith. In the preferred embodiment, the connector portion 52 includes a substantially rectangular connector wall 74 which extends beneath a part of the planar base portion 60. The side edge regions of the connector wall 74 are bent inwardly over the outwardly facing surface of connector wall 74 as best seen in FIG. 5 to form a pair of opposed rails 76. The connector wall 74 and rails 76 together define a channel 78 between them for receiving the contact terminal 54 to effect electrical connection between the contact device 50 and the conductor 18 as described below.

The contact portion 56 of the contact and connector device 50 integrally extends from the edge 64 of the planar base portion 60 and includes a first straight portion 80 and a second curved portion 82. The first straight portion 80 forms a substantial right angle with the planar base portion 60 of fastening portion 58 while the second curved portion 82 has a curved configuration and as best seen in FIG. 4 forms a positive angle $\alpha$ with a plane parallel to the plane of the planar base portion 60 of fastening portion 58. A protuberance 84 is formed at the free end region of contact portion 56.

A sheet metal blank 50' from which a contact and terminal device in accordance with the illustrated embodiment of the invention is made is illustrated in FIG. 6. The parts of the blank which correspond to the various parts of the device 50 are for the sake of clarity designated by the same reference character, primed. Broken lines designate the various fold lines. The blank 86 is formed of a single piece of electrically conductive sheet metal which can be easily stamped from sheet metal stock.

The blank 50' includes a connector portion forming region 52', a curved contact portion forming region 56', and an intermediate fastening portion forming region 58'. As noted above, the ear forming regions 66' extend beyond the side edges 68' of the base portion forming region 60'. The free end portion of each ear forming region 66' is preferably tapered as shown. The connector portion forming region 52' is integrally connected to base portion forming region 60' by web forming region 72' and includes connector wall forming region 74' and rail forming regions 76'. The contact portion forming region 56' includes regions 80' and 82' from which the first straight portion 80 and second curved portion 82 of contact portion 56 are respectively formed. In construction, the ear forming regions 66' are bent upwardly at fold lines a to form a substantial right angle with the plane of the region 60' and the engagement portions 70 are formed by bending along fold lines b and c. The connector portion 52 is formed by bending web forming region 72' as shown in FIG. 7 and then bending rail forming regions 76' along fold lines d to form rails 76. The contact portion 56 is formed by bending the blank along fold line e to form a substantial right angle with the plane of region 60' and then bending the curved region 82' in the opposite direction along fold line f.

Referring to FIGS. 2-4, in the assembly of the contact and connector devices 50 to the transmitter cup 26, two rectangular openings 88 and 90 are formed in the cup base wall 28. Each of the openings 88 and 90 are located and oriented so that when the respective contact devices 50 are assembled thereto, the protuberances 84 of the contact portions 56 will electrically engage the central and outer transmitter contacts 20 and 22 as described below. The width W of each opening (FIGS. 3 and 5) is substantially equal to the spacing between the ears 66. The length L of each opening (FIGS. 3 and 4) is preferably substantially equal to the spacing between the rear edges of the ears 66' and the outer surface of the straight portion of contact portion 56. It will be understood that although one example of the location and orientation of openings 88 and 90 is illustrated in FIG. 3, other possibilities exist and, moreover, the detailed construction of the contact devices 50 may vary from that shown and described within the scope of the invention.

In assembly, a contact device 50 is brought to the transmitter cup from the underside of the base wall 28. The ears 66 are inserted into a respective opening, e.g., opening 90 after passing the contact portion 56 therethrough. The V-shaped engagement portions 70 provide a camming action as the ears are urged further into opening 90 causing the ears to resiliently flex inwardly until insertion has been completed whereupon the ears flex back to their original position as seen in FIG. 5. As the height H (FIG. 5) of the portion of each ear 66 between the engagement portion 70 and the base portion 60 is substantially equal to the thickness of the cup base wall 28, when the engagement portions 70 engage the upper surface of cup base wall 28 the planar base portion 60 is positioned flush against the bottom surface of the cup base wall 28 as best seen in FIGS. 4 and 5. In this manner, the contact device 50 is affixed to the transmitter cup. Moreover, the planar base portion 60 completely covers the opening 90 thereby preventing the passage of dirt or other contaminants into the interior of the transmitter cup. As seen in FIG. 4, the outer surface of the first straight portion 80 of contact portion 56 is contiguous with the forward surface of opening 90 while the rear edges of ears 66 are contiguous with the rear surface of opening 90 thereby preventing shifting of the contact device within opening 90.

The contact terminal 54 of conductor 18 is inserted into the slot 78 of connector portion 52 to effect an electrical connection between the contact device 50 and conductor 18. The other contact device is then affixed to the transmitter cup within opening 88 in the same manner as described above and electrical connection is effected with the other conductor (not shown).

With the contact and terminal devices 50 so positioned and with the contact portions 56 extending upwardly within the transmitter cup 56, the assembly is then inserted into the transmitter end 16 of the telephone handset. The transmitter 24 is then situated over the cup whereupon the cap 40 is screwed tightly onto the handset to fix the transmitter in place. The protuberances 84 of the contact devices 50 electrically engage the inner and outer transmitter contacts 20 and 22 whereby electrical connections are effected between the jack conductors 18 and the transmitter contacts. The length of the straight portion 80 and/or the angle of the curved portion 82 can be adjusted to provide a suitable contact pressure between the protuberances 84 and the transmitter contacts 20 and 22.

It is seen from the foregoing that a new and improved electrical contact and connector device is provided for electrically coupling line or jack conductors to the contacts of a transmitter in a telephone handset. The contact and connector device is simple and economical in both manufacture and assembly.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. An electrical contact and terminal device adapted to be affixed to a transmitter cup of a telephone handset for effecting electrical coupling between a transmitter contact and a conductor terminal, the transmitter cup including a base wall in which at least one opening is formed and a peripheral side wall, comprising:
   a fastening portion including a substantially planar base portion having opposed first and second edges and a pair of ears integrally extending from said planar base portion and forming substantially right angles therewith;
   a contact portion integrally extending from said first edge of said planar base portion, said contact portion including a first straight portion integrally extending from said first edge of said planar base portion and forming a substantially right angle therewith and a second portion integrally extending from said first straight portion and forming an angle with a plane parallel to said planar base portion;
   a connector portion integrally extending from said second edge of said planar base portion including means for electrically engaging the contact terminal of the conductor; and wherein
   said device is formed of a single piece of conductive sheet metal.

2. The combination of claim 1 wherein said ears are spaced from each other by a distance substantially equal to the width of the opening in the cup base wall and includes means formed at free ends thereof for engaging an upper surface of said transmitter cup base wall and wherein the portion of each ear between said planar base portion and said engagement means is substantially equal to the thickness of said transmitter cup base wall in the region of said opening.

3. The combination of claim 1 wherein the length of said first straight portion of said contact portion is greater than the thickness of said transmitter cup base wall in the region of said opening.

4. The combination of claim 1 wherein said second portion of said contact portion is curved.

5. The combination of claim 1 wherein said connector portion is integrally connected to said planar base portion by a web portion integrally extending from said second edge thereof.

6. The combination of claim 5 wherein said web portion is formed with a U-shape so that said connector portion is in opposed relationship to said planar base portion.

7. The combination of claim 5 wherein said connector portion includes means for electrically engaging a spade type contact terminal.

8. In an assembly including a transmitter cup of a telephone handset, said cup including a base wall in which an opening having length, width and depth is formed, said base wall having inner and outer surfaces, and a peripheral side wall, and an electrical contact and terminal device affixed to said transmitter cup adapted to effect electrical coupling between a transmitter contact and a conductor terminal, the improvement comprising:

said electrical contact and terminal device is formed of a single piece of conductive sheet metal and includes a contact portion, a connector portion, and a fastening portion;

said fastening portion includes a substantially planar base portion having opposed first and second edges and a pair of engagement ears integrally extending from said planar base portion and forming substantially right angles therewith, said ears extending through said opening to affix said contact and terminal device to said transmitter cup with said planar base portion flush with the outer surface of said cup base wall;

a contact portion integrally extending from said first edge of said planar base portion, said contact portion including a first straight portion integrally extending from said first edge of said planar base portion through said opening in said transmitter cup and forming a substantially right angle therewith and a second portion situated within said transmitter cup and integrally extending from said first straight portion forming an angle with a plane parallel to said planar base portion; and a connector portion integrally extending from a web portion which integrally extends from said second edge of said planar base portion including means for electrically engaging the contact terminal of the conductor, said web portion being formed with a U-shape and wherein said electrical engaging means are situated in opposed relationship to said planar base portion adjacent the outer surface of said transmitter cup.

9. The combination of claim 8 wherein said first straight portion of said contact portion has a length greater than the depth of said opening and is situated contiguous with a surface defining the opening in the transmitter.

10. The combination of claim 8 wherein said second portion of said contact portion is curved.

11. In an electrical contact and terminal device adapted to be fastened to a structure, said device including a contact portion, a connector portion and a fastening portion, the improvement comprising:

said fastening portion is situated between said contact and connector portions and includes a base portion having opposed first and second edges and means for fixing said device to the structure, said fixing means comprising a pair of ears integrally extending from said base portion and forming substantially right angles therewith;

said contact portion extends from said first edge of said base portion and forms an angle therewith;

said connector portion extends from said second edge of said base portion and includes means for electrically engaging a contact terminal of a conductor; and wherein said device is formed of a single piece of conductive sheet metal.

12. The combination of claim 11 wherein said connector portion is integrally connected to said base portion by a web portion integrally extending from said second edge thereof.

13. The combination of claim 11 wherein said base portion comprises a substantially planar portion.

14. In an electrical contact and terminal device adapted to be fastened to a structure, said device including a contact portion, a connector portion and a fastening portion, the improvement comprising:

said fastening portion is situated between said contact and connector portions and includes a base portion having opposed first and second edges and means for fixing said device to the structure;

said contact portion extends from said first edge of said base portion and forms an angle therewith, said contact portion including a first straight portion integrally extending from said first edge of said base portion and forming a substantially right angle therewith;

said connector portion extends from said second edge of said base portion and includes means for electrically engaging a contact terminal of a conductor; and wherein said device is formed of a single piece of conductive sheet metal.

15. The combination of claim 14 wherein said contact portion further includes a second portion integrally extending from an end of said first straight portion and forming an angle with said base portion.

16. The combination of claim 15 wherein said second portion comprises a curved portion.

17. In an electrical contact and terminal device adapted to be fastened to a structure, said device including a contact portion, a connector portion and a fastening portion, the improvement comprising:

said fastening portion is situated between said contact and connector portions and includes a base portion having opposed first and second edges and means for fixing said device to the structure;

said contact portion extends from said first edge of said base portion and forms an angle therewith;

said connector portion is integrally connected to said base portion by a web portion integrally extending from said second edge thereof and includes means for electrically engaging a contact terminal of a conductor, said web portion being formed so that said connector portion is in opposed relationship to said base portion; and wherein said device is formed of a single piece of conductive sheet metal.

18. In an electrical contact and terminal device adapted to be fastened to a structure, said device including a contact portion, a connector portion and a fastening portion, the improvement comprising:

said fastening portion is situated between said contact and connector portions and includes a base portion having opposed first and second edges and means for fixing said device to the structure;

said contact portion extends from said first edge of said base portion and forms an angle therewith;

said connector portion is integrally connected to said base portion by a web portion integrally extending from said second edge thereof and includes means for electrically engaging a spade type contact terminal of a conductor; and wherein said device is formed of a single piece of conductive sheet metal.

* * * * *